(12) United States Patent
Takagi

(10) Patent No.: US 9,464,535 B2
(45) Date of Patent: Oct. 11, 2016

(54) STATIONARY PART SEALING STRUCTURE

(71) Applicant: KABUSHIKI KAISHA TOSHIBA, Minato-ku (JP)

(72) Inventor: Norikazu Takagi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 183 days.

(21) Appl. No.: 14/287,847

(22) Filed: May 27, 2014

(65) Prior Publication Data

US 2014/0346741 A1 Nov. 27, 2014

(30) Foreign Application Priority Data

May 27, 2013 (JP) ................................. 2013-111261

(51) Int. Cl.
| F01D 11/00 | (2006.01) |
| F01D 9/02 | (2006.01) |
| F02C 7/28 | (2006.01) |

(52) U.S. Cl.
CPC ........... F01D 11/005 (2013.01); F01D 11/003 (2013.01); F02C 7/28 (2013.01); *F01D 9/023* (2013.01); *F05D 2220/31* (2013.01); *F05D 2240/55* (2013.01); *F05D 2240/59* (2013.01); *F05D 2250/294* (2013.01)

(58) Field of Classification Search
CPC .... F01D 11/003; F01D 11/005; F01D 11/02; F01D 9/023; F05D 2240/55; F05D 2240/59; F16J 15/02; F02C 7/28
See application file for complete search history.

(56) References Cited

U.S. PATENT DOCUMENTS

| 3,970,318 | A | * | 7/1976 | Tuley | ............................. | 277/641 |
| 4,063,845 | A | * | 12/1977 | Allen | ............................. | 415/134 |
| 4,379,560 | A | * | 4/1983 | Bakken | ........................ | 277/628 |
| 5,104,286 | A | * | 4/1992 | Donlan | ....................... | 415/170.1 |
| 6,220,603 | B1 | * | 4/2001 | Brandon et al. | .............. | 277/419 |

(Continued)

FOREIGN PATENT DOCUMENTS

| EP | 0 767 329 A1 | 4/1997 |
| EP | 2 351 910 A2 | 8/2011 |

(Continued)

OTHER PUBLICATIONS

Extended European Search Report issued Mar. 31, 2015 in Patent Application No. 14169972.8.

(Continued)

*Primary Examiner* — Kristina Fulton
*Assistant Examiner* — Nicholas L Foster
(74) *Attorney, Agent, or Firm* — Oblon, McClelland, Maier & Neustadt, L.L.P

(57) ABSTRACT

A stationary part sealing structure 10 of an embodiment has an insertion groove 20 formed annularly across a circumferential direction in a wall surface 111*a* and having a groove part 21 and projections 25, 26 projecting respectively from both side faces of the groove part 21 so as to narrow an opening 22 of the groove part 21, an insertion groove 30 formed annularly across a circumferential direction in a wall surface 110*a* which opposes the insertion groove 20 and having a groove part 31 and projections 35, 36 projecting respectively from both side faces of the groove part 31 so as to narrow an opening 32 of the groove part 31, and a platy annular sealing member 40 having an outer diameter side end 41 inserted in the insertion groove 20 and an inner diameter side end 42 inserted in the insertion groove 30.

5 Claims, 11 Drawing Sheets

(56) References Cited

U.S. PATENT DOCUMENTS

| | | | |
|---|---|---|---|
| 8,231,352 B2* | 7/2012 | Hunt et al. | 416/190 |
| 8,430,626 B1* | 4/2013 | Liang | 415/139 |
| 2003/0161725 A1 | 8/2003 | Hirst | |
| 2003/0165381 A1* | 9/2003 | Fokine et al. | 415/110 |
| 2004/0173975 A1* | 9/2004 | Hirst | 277/603 |
| 2006/0082074 A1* | 4/2006 | Synnott et al. | 277/641 |
| 2011/0164965 A1* | 7/2011 | Smith et al. | 415/182.1 |
| 2011/0299978 A1* | 12/2011 | Afanasiev et al. | 415/173.6 |
| 2012/0070269 A1 | 3/2012 | Mizutani et al. | |
| 2013/0104565 A1* | 5/2013 | Casavant et al. | 60/805 |
| 2014/0072418 A1* | 3/2014 | Casavant et al. | 415/182.1 |
| 2014/0363622 A1 | 12/2014 | Lazur | |

FOREIGN PATENT DOCUMENTS

| | | |
|---|---|---|
| EP | 2 431 569 A2 | 3/2012 |
| EP | 2 587 002 A2 | 5/2013 |
| JP | 2011-140945 | 7/2011 |
| WO | WO 2014/150147 A1 | 9/2014 |

OTHER PUBLICATIONS

Office Action issued Feb. 19, 2016 in Korean Patent Application No. 10-2014-0059500 (with English language translation).

* cited by examiner

STATIONARY PART SEALING STRUCTURE

CROSS-REFERENCE TO RELATED APPLICATION

This application is based upon and claims the benefit of priority from Japanese Patent Application No. 2013-111261, filed on May 27, 2013; the entire contents of which are incorporated herein by reference.

FIELD

Embodiments described herein relate generally to a stationary part sealing structure.

BACKGROUND

In a conventional steam turbine, a contact-type fin or fitting structural part which partitions spaces under different pressures is provided between two independent stationary parts, so as to suppress leakage of steam. The contact-type fin suppresses leakage of steam by pressing the fin against an opposing stationary part by an elastic member.

In the fitting structural part, a fitting projection formed in a circumferential direction on one stationary part is fitted in a fitting recess formed in the circumferential direction in the other stationary part, to thereby suppress leakage of steam. In this case, leakage of steam is suppressed by that a steam joint surface is formed by pressing the stationary part against the other stationary part by a pressure difference, or that a flow path of steam is narrowed by setting a small gap between the fitting projection and the fitting recess.

Further, in a conventional steam turbine, a groove is formed in the circumferential direction in each of opposing stationary parts, and leakage of steam is suppressed by fitting an annular sealing member having a spherical edge in the respective grooves.

When a space between two independent stationary parts is sealed, the stationary parts move in an axial direction of the turbine rotor (hereinafter referred to as an axial direction) or a radial direction of the turbine rotor (hereinafter referred to as a radial direction) due to a temperature difference between the both stationary parts, a linear expansion coefficient difference, a difference in thermal elongation starting point, and the like. Thus, a positional displacement occurs between the stationary parts.

When a conventional contact type fin is used, if a positional displacement occurs in the axial direction, wear and/or scoring of the fin may occur. The elasticity of the elastic member of the contact-type fin is small, and the range of following a positional displacement in the radial direction has been limited. On the other hand, when the conventional fitting structure is used, if a positional displacement occurs in the axial direction, an excessive stress may occur in the fitting part and the fitting projection may break.

When the sealing structure in which the annular sealing member having a spherical end is fitted in the groove is used, if a positional displacement occurs in the axial direction, the annular sealing member deforms and follows. However, this sealing method has a problem in reliability of the sealing because it uses a contact between a spherical surface and a flat surface, that is, a linear contact. Further, when the annular sealing member deforms, the dividing part of an upper half portion and a lower half portion of the annular sealing member opens, and an uneven deformation may occur across the entire circumference. Thus, a portion where the annular sealing member does not contact a wall surface of the groove may occur, and steam may leak therefrom.

DETAILED DESCRIPTION

In one embodiment, there is a stationary part sealing structure provided between a first stationary part and a second stationary part and partitioning spaces under different pressures. The stationary part sealing structure includes a first insertion groove formed annularly across a circumferential direction in a wall surface, which opposes the second stationary part, of the first stationary part, the first insertion groove having a first groove part and a pair of first projections projecting respectively from both side faces of the first groove part so as to narrow an opening of the first groove part, and a second insertion groove formed annularly across a circumferential direction in a wall surface, which opposes the first insertion groove, of the second stationary part, the second insertion groove having a second groove part and a pair of second projections projecting respectively from both side faces of the second groove part so as to narrow an opening of the second groove part. Moreover, the stationary part sealing structure has a platy annular sealing member having an outer diameter side end inserted in the first insertion groove and an inner diameter side end inserted in the second insertion groove. Then, the sealing member is pressed against one of the first projections and one of the second projections due to a pressure difference between the partitioned spaces.

Hereinafter, embodiments will be described with reference to drawings.

(First Embodiment)

Figure 1:
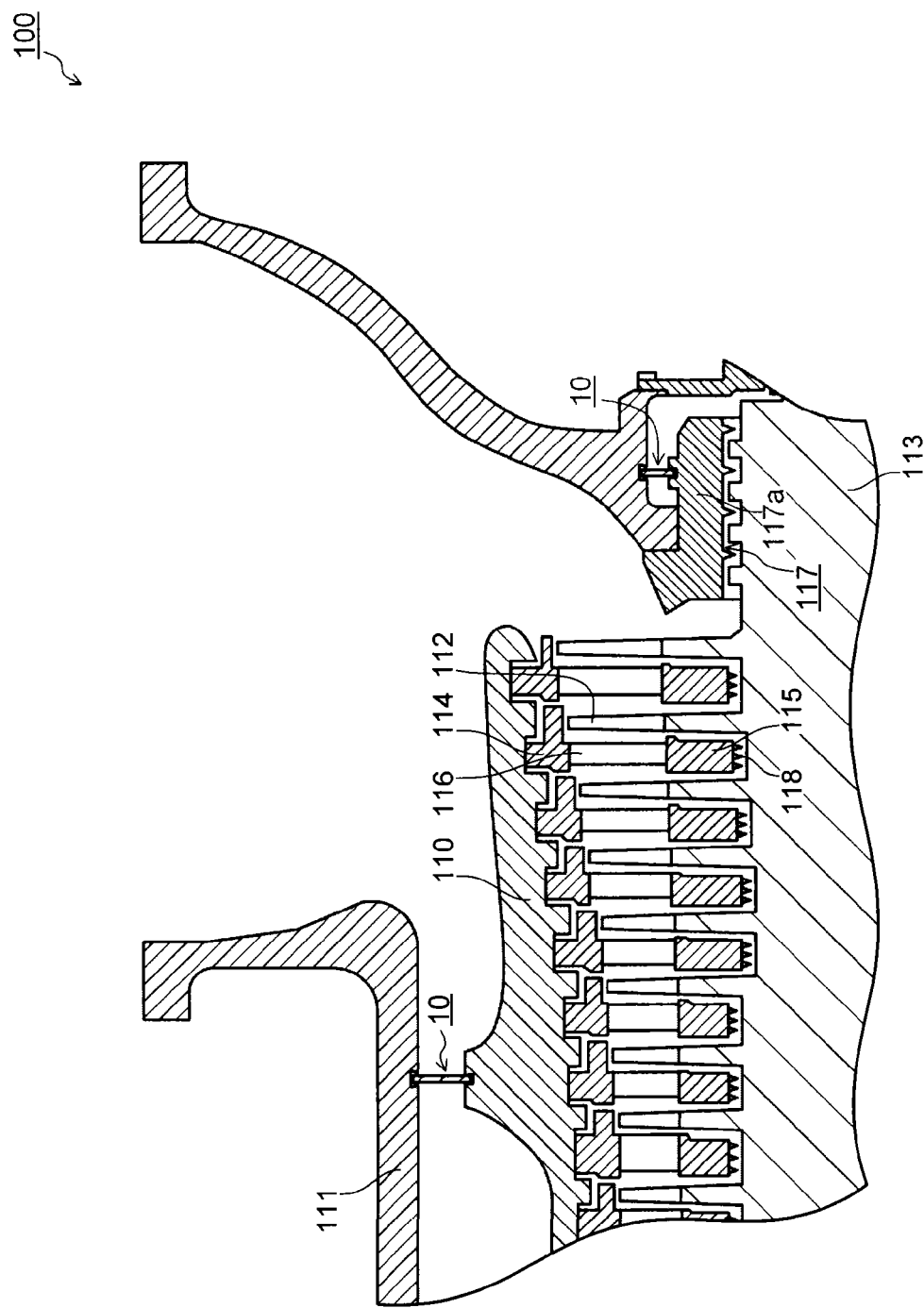
FIG. 1 is a view illustrating part of a meridian cross section of a steam turbine having a stationary part sealing structure of a first embodiment.

FIG. 1 is a view illustrating part of a meridian cross section of a steam turbine 100 having a stationary part sealing structure 10 of a first embodiment.

As illustrated in FIG. 1, the steam turbine 100 has a casing of double structure constituted of an inner casing 110 and an outer casing 111 provided outside thereof. Further, a turbine rotor 113 in which rotor blades 112 are implanted is provided through the inside of the inner casing 110. This turbine rotor 113 is supported rotatably by a rotor bearing (not illustrated).

Stationary blades 116 each supported between a diaphragm outer ring 114 and a diaphragm inner ring 115 are disposed inside the inner casing 110. The stationary blades 116 are provided alternately with the rotor blades 112 in an axial direction of the turbine rotor 113.

A gland sealing part 117 is provided between the turbine rotor 113 and each casing so as to suppress leakage of steam to the outside. Further, a sealing part 118 is provided between the turbine rotor 113 and the diaphragm inner ring 115 so as to suppress leakage of steam to a downstream side.

The stationary part sealing structure 10 which partitions spaces under different pressures is provided between the inner casing 110 and the outer casing 111. Further, the stationary part sealing structure 10 is also provided between, for example, a gland casing 117a constituting the gland sealing part 117 and the outer casing 111. These inner casing 110, outer casing 111 and gland casing 117a are stationary parts. Besides them, the stationary part sealing structure 10 can be provided between any other stationary parts. Also in this case, the stationary part sealing structure 10 partitions spaces under different pressures and suppresses leakage of steam.

Here, the steam turbine 100 to which the stationary part sealing structure 10 is applied is not limited in particular. For example, the stationary part sealing structure 10 can be applied to a super high pressure turbine, a high pressure turbine, an intermediate pressure turbine, a low pressure turbine, or the like.

Next, the stationary part sealing structure 10 will be described in detail.

Figure 2:
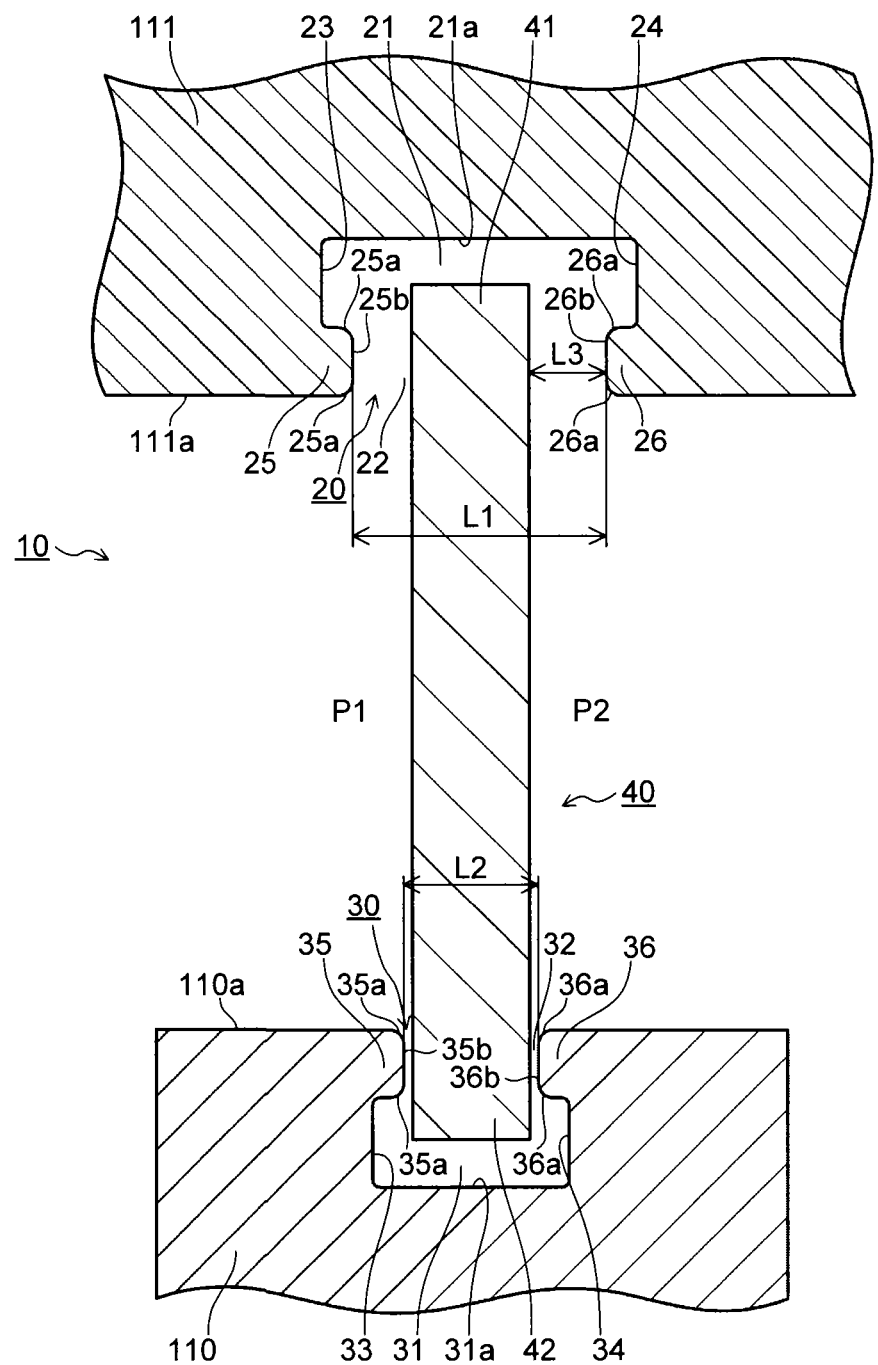
FIG. 2 is a view illustrating a vertical cross section of the stationary part sealing structure of the first embodiment.
Figure 3:
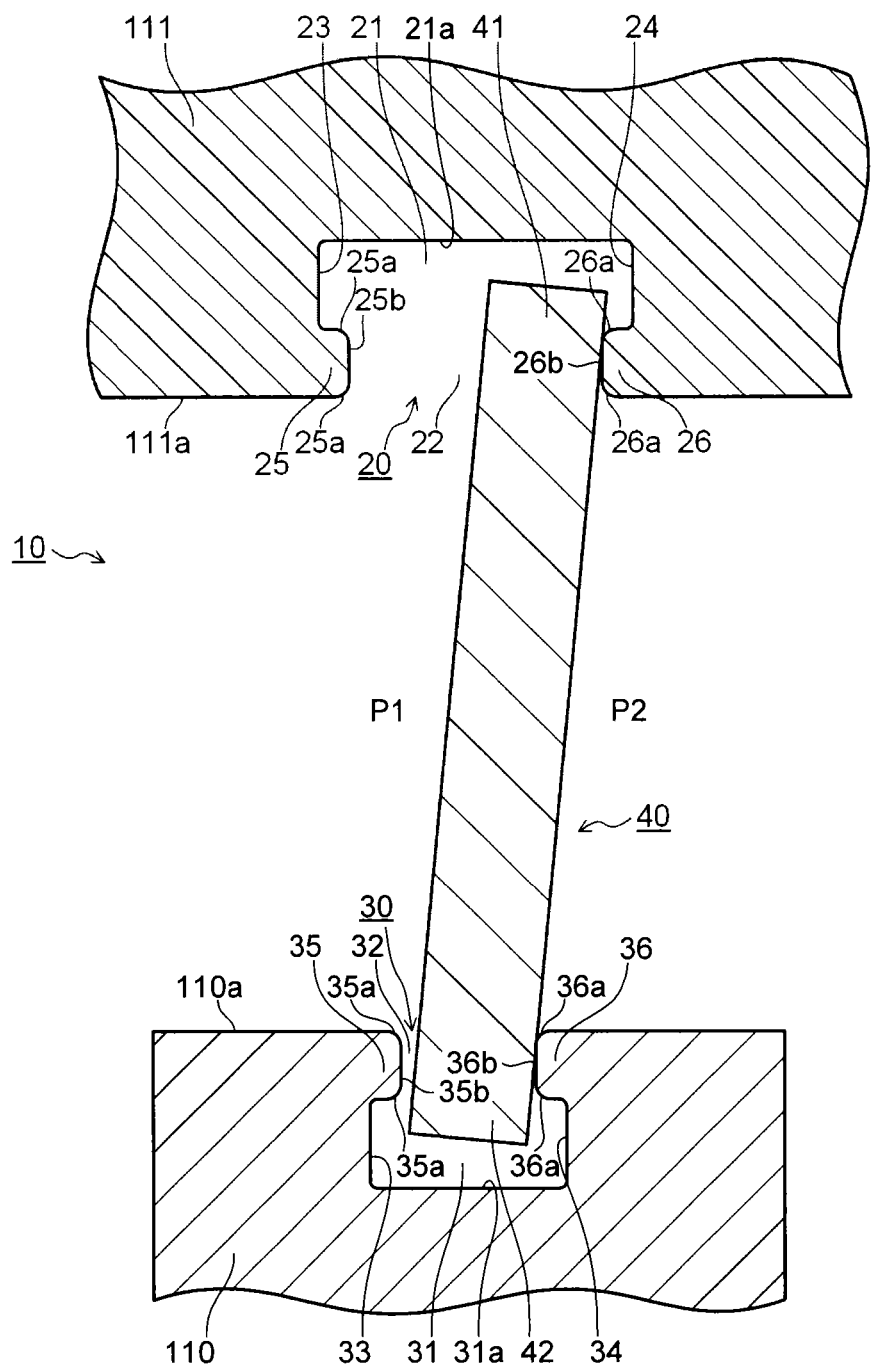
FIG. 3 is a view illustrating a vertical cross section of the stationary part sealing structure of the first embodiment.
Figure 4:
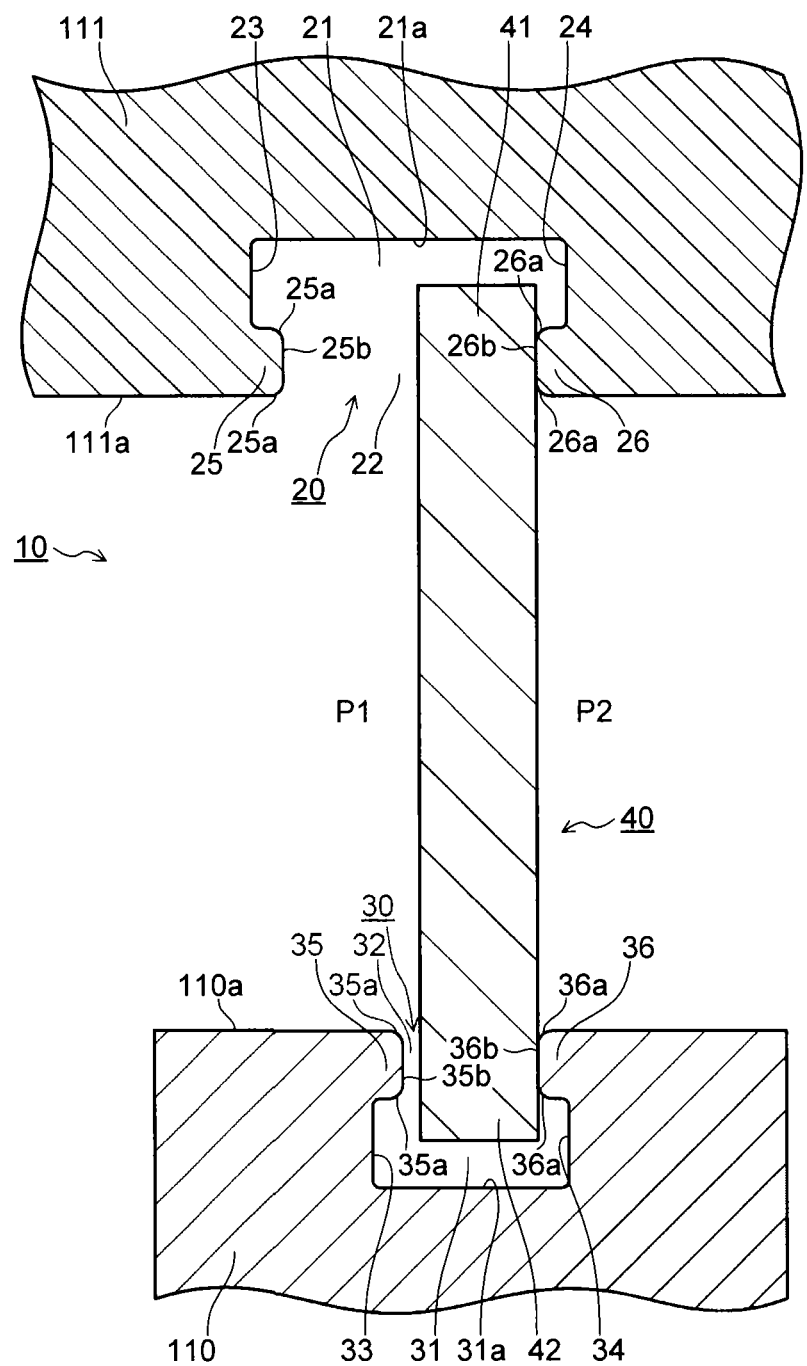
FIG. 4 is a view illustrating a vertical cross section of the stationary part sealing structure of the first embodiment.

FIG. 2 to FIG. 4 are views illustrating a vertical cross section of the stationary part sealing structure 10 of the first embodiment. Here, FIG. 2 illustrates a state that the steam turbine 100 is not operated, FIG. 3 illustrates a state that the steam turbine 100 is operated but a positional displacement due to a thermal elongation difference has not occurred between stationary parts, and FIG. 4 illustrates a state that the steam turbine 100 is operated and a positional displacement due to a thermal elongation difference has occurred between stationary parts.

Here, the stationary part sealing structure 10 provided between the inner casing 110 and the outer casing 111 will be described by way of example. Note that, for example, the outer casing 111 functions as a first stationary part and the inner casing 110 functions as a second stationary part.

An insertion groove 20 is formed annularly across a circumferential direction in a wall surface 111a, which opposes the inner casing 110, of the outer casing 111. The insertion groove 20 has, as illustrated in FIG. 2, a groove part 21 having a substantially square cross section and projections 25, 26 projecting respectively from both side surfaces 23, 24 of the groove part 21 so as to narrow an opening 22 of the groove part 21. Here, for example, the insertion groove 20 functions as a first insertion groove, the groove part 21 functions as a first groove part, and the projections 25, 26 function as a pair of first projections.

An insertion groove 30 is formed annularly across a circumferential direction in a wall surface 110a, which opposes the insertion groove 20, of the inner casing 110. The insertion groove 30 has, as illustrated in FIG. 2, a groove part 31 having a substantially square cross section and projections 35, 36 projecting respectively from both side surfaces 33, 34 of the groove part 31 so as to narrow an opening 32 of the groove part 31. Here, for example, the insertion groove 30 functions as a second insertion groove, the groove part 31 functions as a second groove part, and the projections 35, 36 function as a pair of second projections.

Among corners 25a, 26a, 35a, 36a of the projections 25, 26, 35, 36, preferably, at least a corner against which a sealing member 40, which will be described later, is pressed is, for example, round chamfered (R-chamfered).

Figure 11:
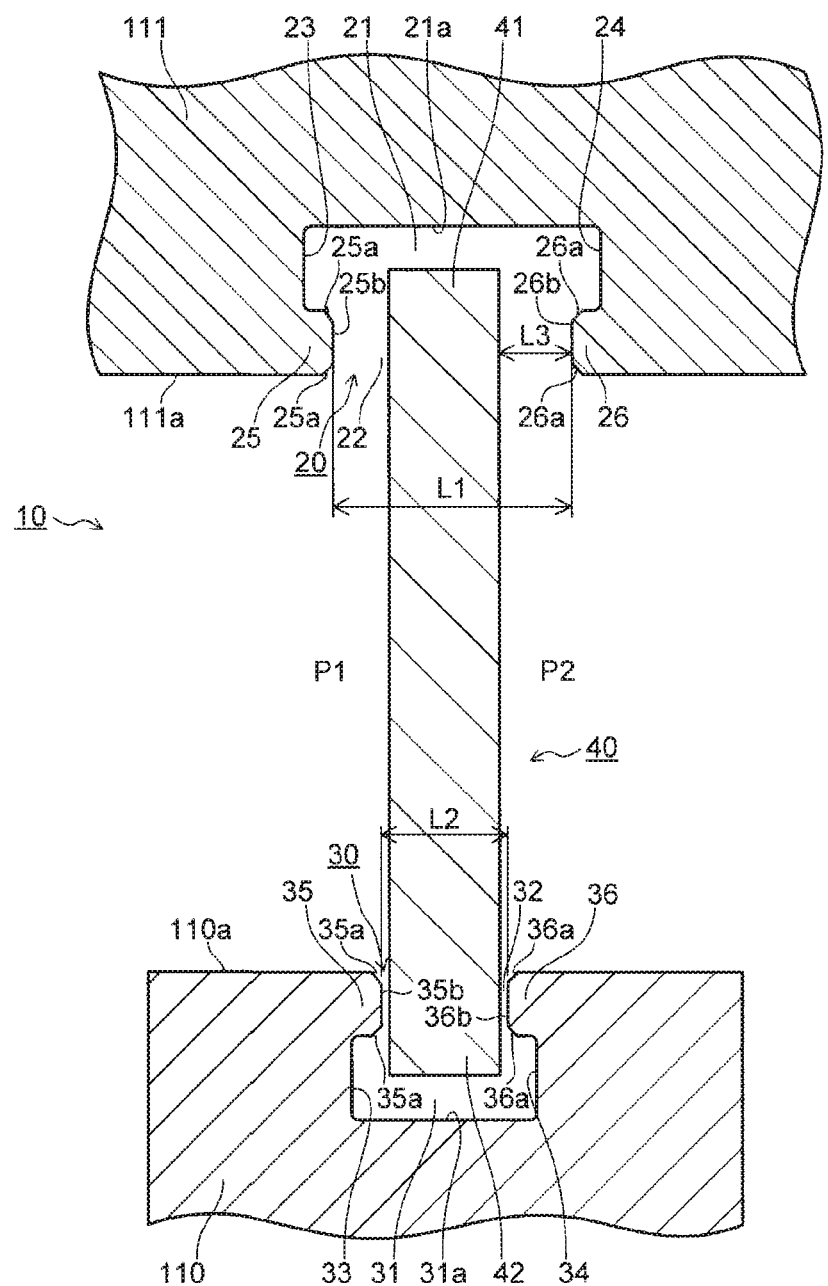
FIG. 11 is a view illustrating a vertical cross section of the stationary part sealing structure having a flat chamfer of the corner portions of the first embodiment.

Further, among the corners 25a, 26a, 35a, 36a of the projections 25, 26, 35, 36, preferably, at least a corner against which a sealing member 40, which will be described later, is pressed may be, for example, flat chamfered (C-chamfered) as shown in FIG. 11. Projection surfaces 25b, 26b, 35b, 36b of the projections 25, 26, 35, 36 excluding the corners 25a, 26a, 35a, 36a are constituted of a vertical flat surface.

A platy annular sealing member 40 is inserted in the insertion groove 20 and the insertion groove 30. Specifically, an outer diameter side end 41 of the sealing member 40 is inserted in the insertion groove 20, and an inner diameter side end 42 of the sealing member 40 is inserted in the insertion groove 30.

Preferably, the sealing member 40 is formed of the same material as the material constituting a stationary part (here, the inner casing 110 or the outer casing 111), or formed of a material having equivalent heat resistance, linear expansion coefficient, and the like. Further, the sealing member 40 is pressed against the projection 26 and the projection 36 by a pressure difference (P1−P2) (here P1>P2) between the partitioned spaces as illustrated in FIG. 3 in a state that the steam turbine 100 is operated and a positional displacement due to a thermal elongation difference has not occurred between the stationary parts. A thickness of the sealing member 40 is preferably made thin within a range that it can resist the pressure at this time, so that the sealing member 40 can undergo a deformation such as bending.

Here, an opening distance L1 between the projection 25 and the projection 26 is set longer than an opening distance L2 between the projection 35 and the projection 36. Note that here although an example of setting the opening distance L1 longer than the opening distance L2 is described here, the opening distance L2 may be set longer than the opening distance L1.

As described above, in a state that the steam turbine 100 is operated but the positional displacement due to the thermal elongation difference has not occurred between the stationary parts, when the sealing member 40 is pressed against the projection 26 and the projection 36, the sealing member 40 changes to a slanted state in the cross section illustrated in FIG. 3. One of reasons for setting the opening distance L1 and the opening distance L2 as described above is to prevent the inner diameter side end 42 of the sealing member 40 inserted in the insertion groove 30 from contacting the projection 35 in this slanted state. For example, when the sealing member 40 is pressed against the projection 26 and the projection 36, if the inner diameter side end 42 of the sealing member 40 contacts the projection 35, a stress applies to the inner diameter side end 42, which may damage the sealing member 40.

A distance L3 between the sealing member 40 and the projection 26 in a state that the steam turbine 100 is not operated is set in consideration of a positional displacement in the turbine rotor axial direction due to the thermal elongation difference between the stationary parts. Specifically, for example, the distance L3 is set so that, when the positional displacement in the turbine rotor axial direction due to the thermal elongation difference between the stationary parts becomes maximum, the sealing member 40 becomes vertical and is in plane-to-plane contact with the projection 26 and the projection 36 as illustrated in FIG. 4.

Predetermined gaps are provided between the sealing member 40 and a bottom 21a of the groove part 21 and a bottom 31a of the groove part 31. The gaps are set so that the sealing member 40 does not contact the bottom 21a and the bottom 31a when a thermal elongation occurs in the vertical direction of the stationary parts and the sealing member 40.

Here, the connection between an upper half 43 and a lower half 44 of the sealing member 40 will be described.

Figure 5:
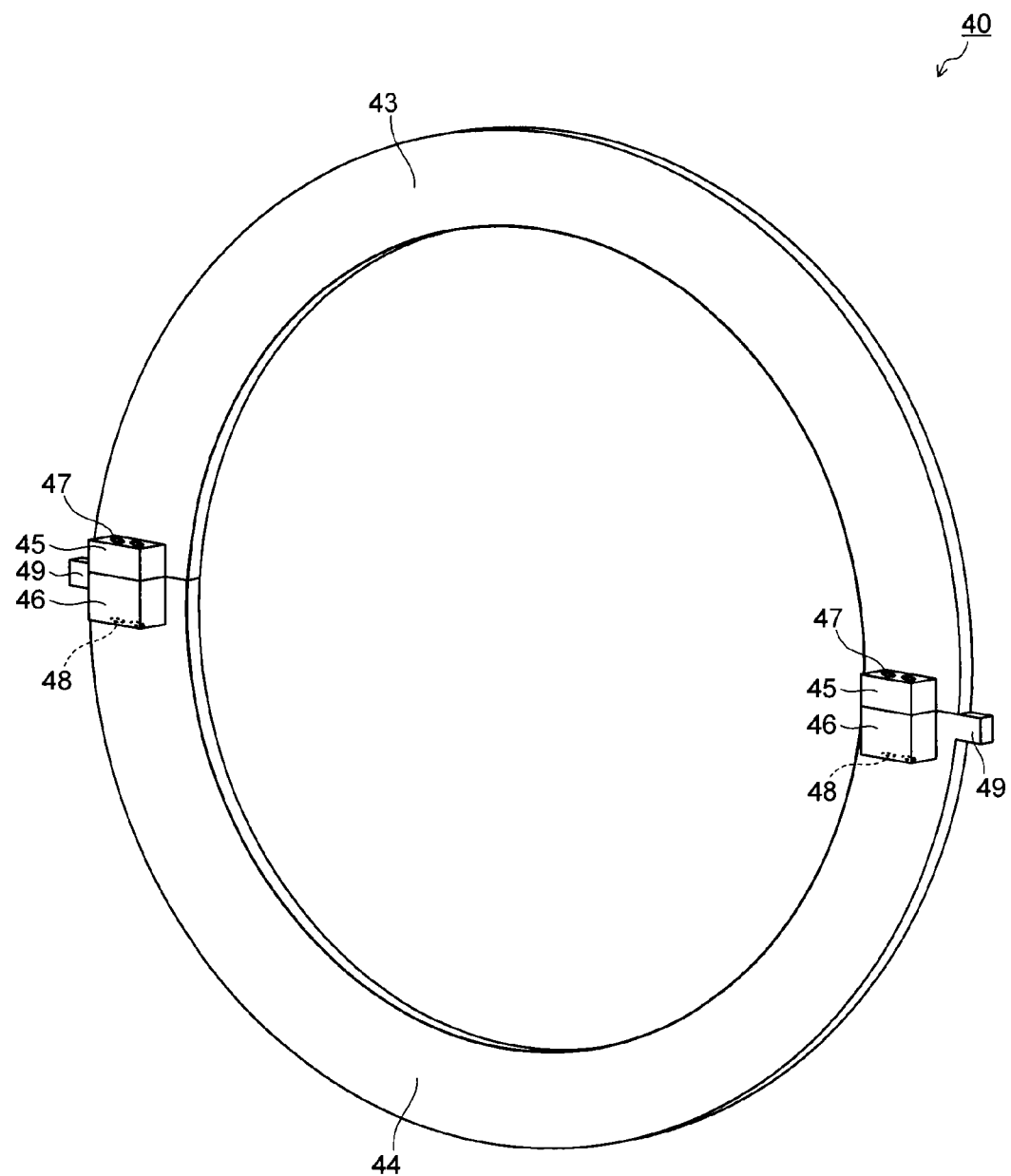
FIG. 5 is a perspective view of a sealing member constituting the stationary part sealing structure of the first embodiment.

FIG. 5 is a perspective view of the sealing member 40 constituting the stationary part sealing structure 10 of the first embodiment. As illustrated in FIG. 5, the sealing member 40 forms a platy annular form by connecting the upper half 43 and the lower half 44. On both ends in the circumferential direction of one surface of the upper half 43 and the lower half 44, flanges 45, 46 are provided respectively.

Bolt holes 47, 48 for inserting a bolt are formed in the flanges 45, 46. Then, the upper half 43 and the lower half 44 are fastened with bolts via the bolt holes 47, 48, so as to connect the upper half 43 and the lower half 44.

Here, on outer peripheries of both ends in the circumferential direction of the lower half 44, horizontal supports 49 projecting radially outward are formed. By locking this horizontal supports 49 onto, for example, a horizontal end surface of the outer casing 111, the sealing member 40 is supported on the outer casing 111. The sealing member 40 is supported to be slightly movable in the turbine rotor axial direction and the radial direction.

Note that the horizontal supports 49 may be formed integrally with the lower half 44. Further, the horizontal supports 49 may be formed separately from the lower half 44 and then joined to the lower half 44.

By thus connecting the upper half 43 and the lower half 44, leakage of steam from the dividing part can be suppressed.

Figure 6:
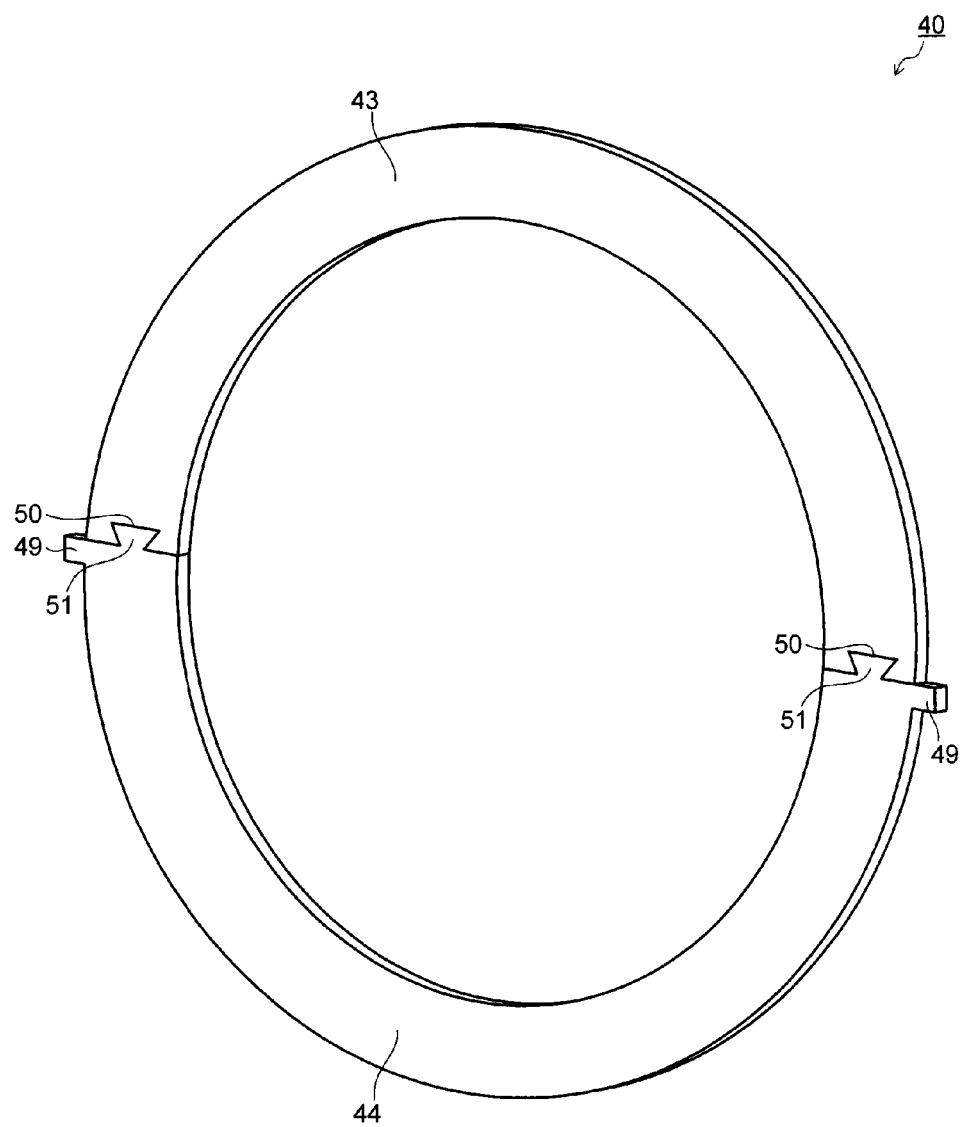
FIG. 6 is a perspective view of the sealing member constituting the stationary part sealing structure of the first embodiment for describing another method of connecting an upper half and a lower half

Note that the connecting method of the upper half 43 and the lower half 44 of the sealing member 40 is not limited to the above-described connecting method. FIG. 6 is a perspective view of the sealing member 40 constituting the stationary part sealing structure 10 of the first embodiment for describing another method of connecting the upper half 43 and the lower half 44.

As illustrated in FIG. 6, for example, fitting recesses 50 may be formed in both ends in the circumferential direction of the upper half 43, and fitting projections 51 to be fit in the fitting recess 50 may be formed in both ends in the circumferential direction of the lower half 44. The cross-sectional shape of the fitting recess 50 and the fitting projection 51 that is perpendicular to the thickness direction of the sealing member 40 is, for example, a trapezoidal shape in which an upper bottom is longer than a lower bottom.

By forming the fitting recess 50 and the fitting projection 51 in such a shape, an opening force perpendicular to the cross section of the dividing part that occurs when the sealing member 40 deforms can be suppressed by the fitting part.

Next, operation of the stationary part sealing structure 10 will be described with reference to FIG. 2 to FIG. 4.

First, the stationary part sealing structure 10 in a state that the steam turbine 100 is not operated will be described. As illustrated in FIG. 2, the outer diameter side end 41 of the sealing member 40 is inserted in the insertion groove 20 separately with the distance L3 in the axial direction from the projection 26. The inner diameter side end 42 of the sealing member 40 is inserted at a substantially center in the axial direction of the insertion groove 30. In this state, the sealing member 40 is disposed vertically.

Next, the stationary part sealing structure 10 in a state that the steam turbine 100 is operated but the positional displacement due to the thermal elongation difference has not occurred between the stationary parts (here, between the inner casing 110 and the outer casing 111) will be described.

When the steam turbine 100 is operated from the state illustrated in FIG. 2, the sealing member 40 is pressed against the projection 26 and the projection 36 by the pressure difference (P1−P2) (here P1>P2) between the partitioned spaces. At this time, the sealing member 40 may bend to the low pressure side by the pressing pressure.

Figure 7:
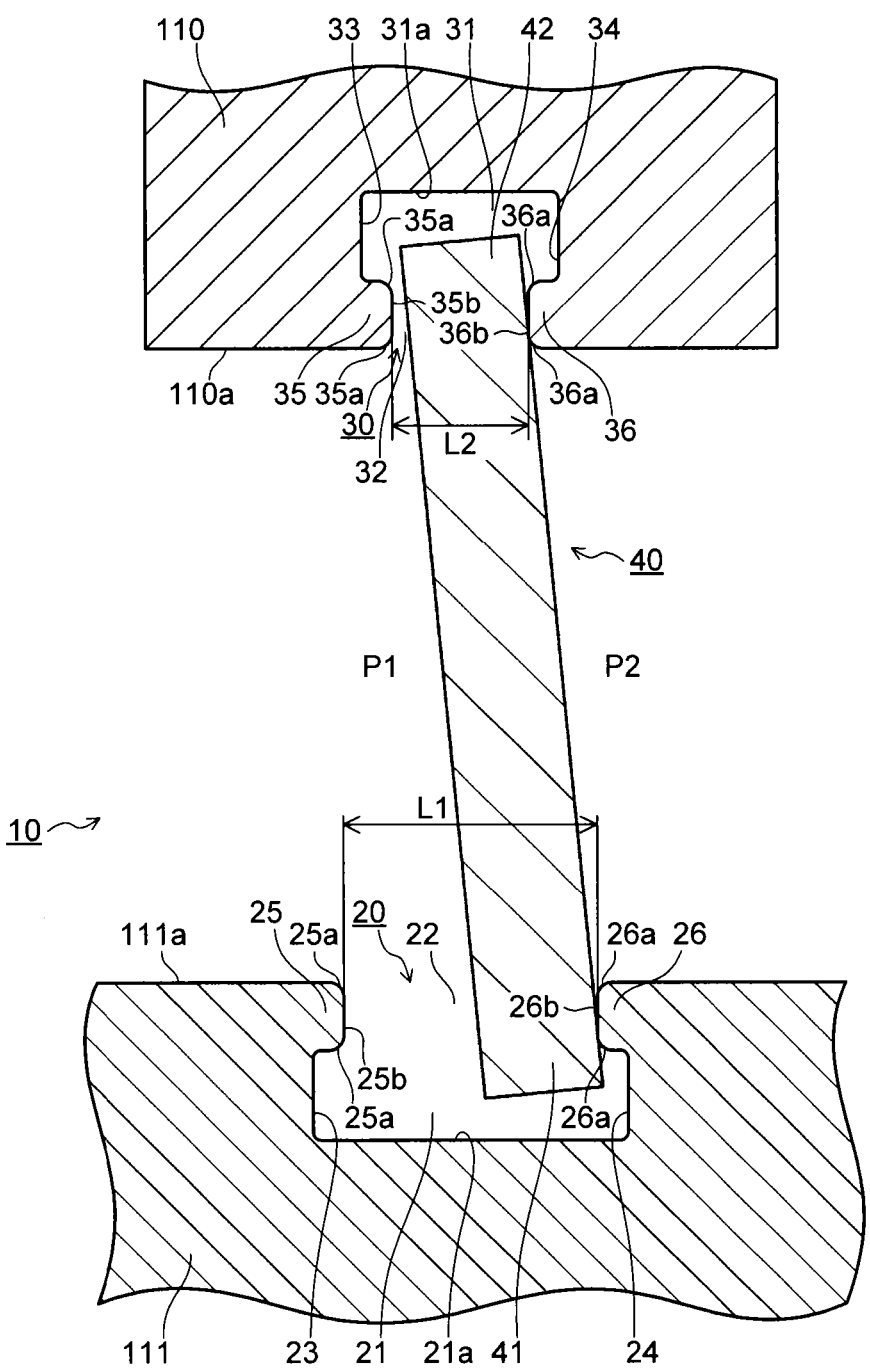
FIG. 7 is a view illustrating a vertical cross section of the lower half of the stationary part sealing structure of the first embodiment.

Note that although the cross section of the upper half of the sealing member 40 is described here, the lower half will be in a state similar to the cross section of the upper half. FIG. 7 is a view illustrating a vertical cross section of the lower half of the stationary part sealing structure 10 of the first embodiment. That is, as illustrated in FIG. 7, also in the lower half, the sealing member 40 is pressed against the projection 26 and the projection 36.

In this manner, the sealing member 40 is pressed against the projection 26 and the projection 36 by the pressure difference. Thus, it is possible to suppress leakage of steam from the high pressure side to the low pressure side.

Next, the stationary part sealing structure 10 in a state that the steam turbine 100 is operated and the positional displacement due to the thermal elongation difference has occurred between the stationary parts will be described.

When an operation toward a rated operation of the steam turbine 100 is performed from the state illustrated in FIG. 3 and FIG. 7, the positional displacement due to the thermal elongation difference occurs between the stationary parts. At this time, while being pressed against the projection 26 and the projection 36, the sealing member 40 smoothly changes in posture along the round-chamfered corners 26a, 36a of the projection 26 and the projection 36. Then, the sealing member 40 becomes vertical as illustrated in FIG. 4. In this state, the sealing member 40 is in plane-to-plane contact with the projection surface 26b of the projection 26 and the projection surface 36b of the projection 36 which are vertical flat surfaces. Thus, leakage of steam from the high pressure side to the low pressure side can be suppressed securely. Here, the state illustrated in FIG. 4 is realized during, for example, the rated operation of the steam turbine 100.

As described above, in the stationary part sealing structure 10 of the first embodiment, even when the positional displacement due to the thermal elongation difference has occurred between the stationary parts, the spaces under different pressures can be partitioned, and leakage of steam from the high pressure side to the low pressure side can be suppressed.

(Second Embodiment)

Figure 8:
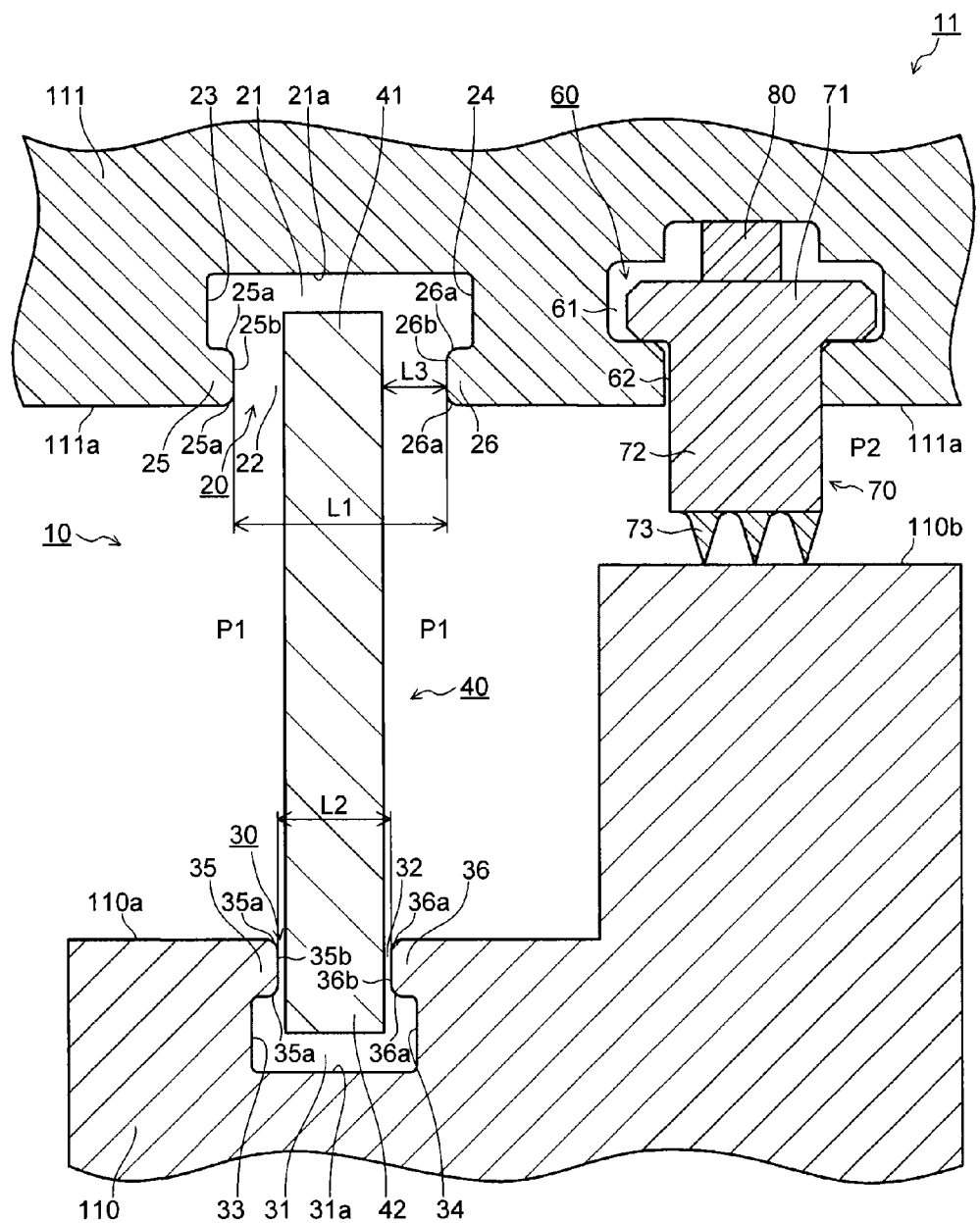
FIG. 8 is a view illustrating a vertical cross section of a stationary part sealing structure of a second embodiment.

FIG. 8 is a view illustrating a vertical cross section of a stationary part sealing structure 11 of a second embodiment. Here, FIG. 8 illustrates a state that the steam turbine 100 is not operated. Note that the same reference signs are given to the same components as those in the stationary part sealing structure 10 of the first embodiment, and overlapping descriptions will be omitted or simplified.

The stationary part sealing structure 11 of the second embodiment is structurally the same as the stationary part sealing structure 10 of the first embodiment except having a sealing fin 70. Accordingly, this different structure will be mainly described here. Note that also in the second embodiment, the stationary part sealing structure 11 provided between the inner casing 110 and the outer casing 111 is exemplified and described.

As illustrated in FIG. 8, the stationary part sealing structure 11 has the stationary part sealing structure 10 of the first embodiment and the sealing fin 70. The sealing fin 70 is what is called a contact type fin. The sealing fin 70 is provided adjacent to the stationary part sealing structure 10 in the axial direction.

As illustrated in FIG. 8, in the wall surface 111a, which opposes the inner casing 110, of the outer casing 111, a housing groove 60 housing part of the sealing fin 70 is formed along the circumferential direction. The sealing fin 70 has a wide part 71 housed in the housing groove 60, a narrow part 72 extending toward the inner casing 110 side from the wide part 71, and fins 73 projecting from the narrow part 72 toward the inner casing 110 side. The fins 73 have an annular platy shape and are provided at intervals in the axial direction.

The housing groove 60 has a wide part 61 and a narrow part 62 corresponding to the wide part 71 and the narrow part 72 of the sealing fin 70. By housing the wide part 71 of the sealing fin 70 in the wide part 61 of the housing groove 60, the sealing fin 70 is movable in the radial direction and moreover will not be pulled out of the housing groove 60.

On a bottom of the housing groove 60, an elastic member 80 is disposed. The elastic member 80 is constituted of, for example, a leaf spring or the like. The sealing fin 70 is pressed against the inner casing 110 side by the elastic member 80. Thus, tips of the fins 73 are pressed against a wall surface 110b of the opposing inner casing 110.

In the inner casing 110, the part having the wall surface 110b to which the fins 73 oppose is structured to have a large outer diameter than the part having the wall surface 110a. That is, in the cross section illustrated in FIG. 8, the part to which the fins 73 oppose projects outward in the radial direction from the wall surface 110a.

Next, operation of the stationary part sealing structure 11 will be described with reference to FIG. 8 to FIG. 10.

Figure 9:
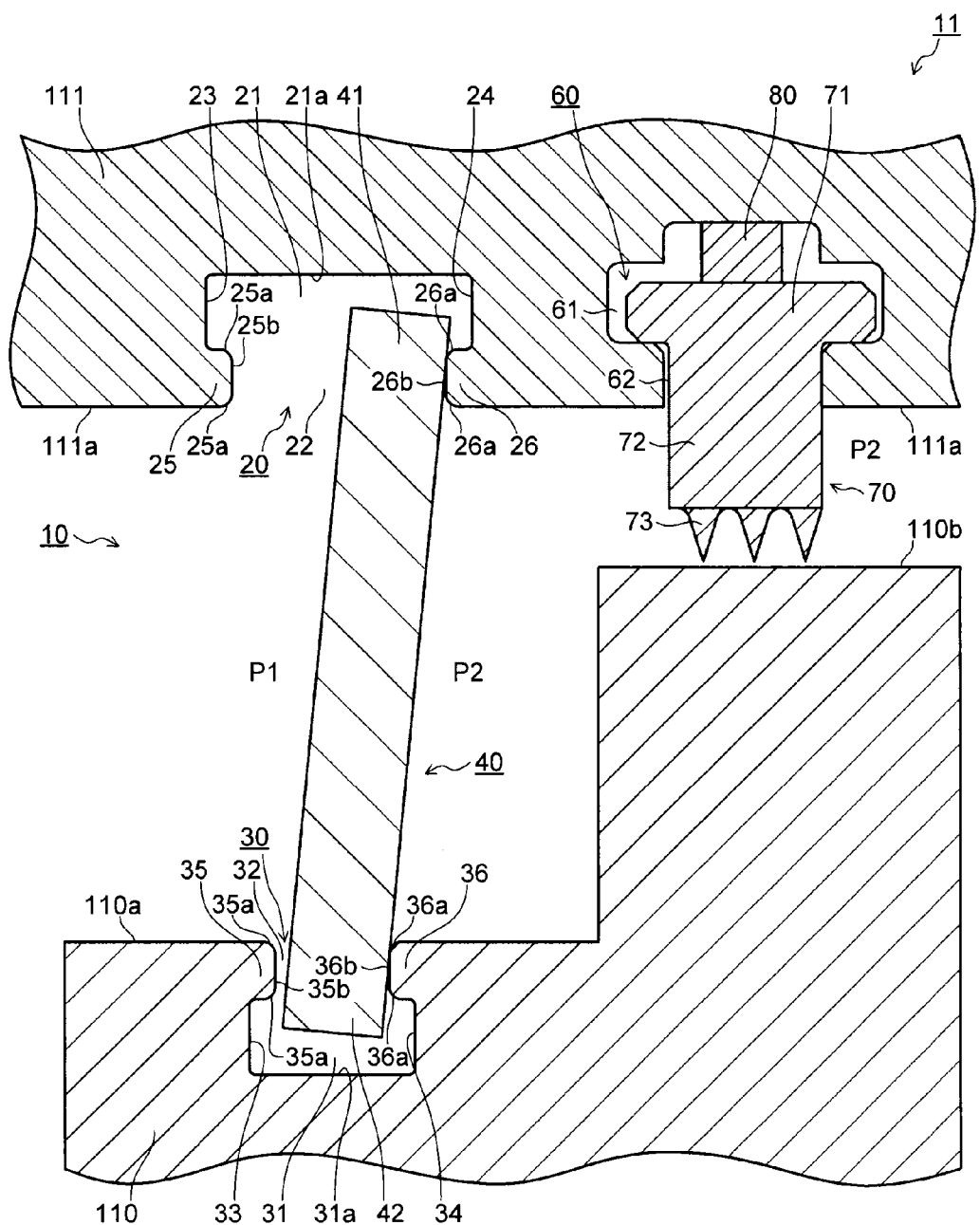
FIG. 9 is a view illustrating a vertical cross section of the stationary part sealing structure of the second embodiment.
Figure 10:
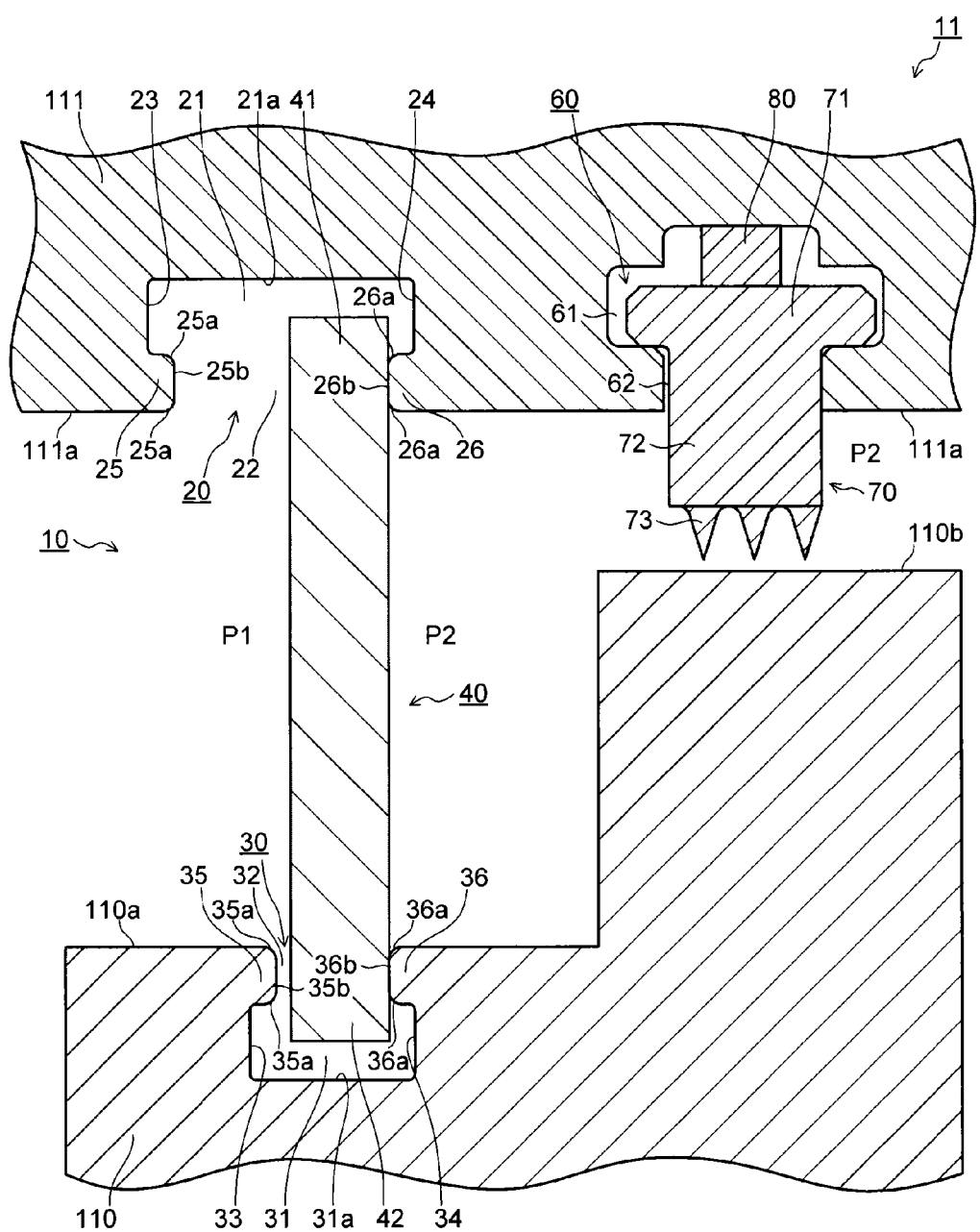
FIG. 10 is a view illustrating a vertical cross section of the stationary part sealing structure of the second embodiment.

FIG. 9 and FIG. 10 are views illustrating a vertical cross section of the stationary part sealing structure 11 of the second embodiment. Here, FIG. 9 illustrates a state that the steam turbine 100 is operated, a positional displacement due to a thermal elongation difference occurs between stationary parts, and the sealing fin 70 has lost its sealing function. FIG. 10 illustrates a state that the steam turbine 100 is operated, a positional displacement due to a thermal elongation difference occurs between stationary parts, and the sealing member 40 is exhibiting its sealing function.

First, the stationary part sealing structure 11 in a state that the steam turbine 100 is not operating will be described. The operation in the stationary part sealing structure 10 is as described in the first embodiment.

On the other hand, the tips of the fins 73 of the sealing fin 70 are, as illustrated in FIG. 8, pressed against the wall surface 110b of the inner casing 110 and are in contact therewith. That is, in this state, the fins 73 of the sealing fin 70 are exhibiting a sealing function.

Next, the stationary part sealing structure 11 in a state that the steam turbine 100 is operated, and the positional displacement due to the thermal elongation difference has not occurred between the stationary parts (here, between the inner casing 110 and the outer casing 111), will be described.

In this state, as illustrated in FIG. 8, the outer diameter side end 41 of the sealing member 40 is inserted in the insertion groove 20 separately with the distance L3 in the axial direction from the projection 26. The inner diameter side end 42 of the sealing member 40 is inserted at a substantially center in the axial direction of the insertion groove 30. Then, the sealing member 40 is disposed vertically. Thus, pressures (P1) of the spaces sandwiching the sealing member 40 are equal. That is, the sealing member 40 is not exhibiting its sealing function.

On the other hand, as described above, the tips of the fins 73 of the sealing fin 70 are pressed against the wall surface 110b of the inner casing 110. Accordingly, the sealing fin 70 is exhibiting its sealing function. Note that the pressure difference (P1−P2) (here P1>P2) has occurred between the spaces sandwiching the sealing fin 70.

Next, the stationary part sealing structure 11 in a state that the steam turbine 100 is operated and the positional displacement due to the thermal elongation difference has occurred between the stationary parts will be described.

When the positional displacement due to the thermal elongation difference occurs between stationary parts, the tips of the fins 73 of the sealing fin 70 separate from the wall surface 110b of the inner casing 110 as illustrated in FIG. 9. At that moment, the pressure difference (P1−P2) occurs between the spaces sandwiching the sealing member 40, and the sealing member 40 is pressed against the projection 26 and the projection 36. This state is as described with reference to FIG. 3 in the first embodiment. The sealing member 40 suppresses leakage of steam from the high pressure side to the low pressure side.

Now, the reason for the tips of the fins 73 separate from the wall surface 110b of the inner casing 110 when the positional displacement due to the thermal elongation difference occurs between the stationary parts is that a difference occurs in thermal expansion amount in the radial direction due to a temperature difference between the outer casing 111 and the inner casing 110.

Thus, at the moment the tips of the fins 73 separate from the wall surface 110b, the sealing member 40 is pressed against the projection 26 and the projection 36. Accordingly, leakage of steam from the high pressure side to the low pressure side can be reduced further.

On the other hand, the tips of the fins 73 of the sealing fin 70 separate from the wall surface 110b. Accordingly, the sealing function by the sealing fin 70 is lost.

When an operation toward a rated operation of the steam turbine 100 is performed from this state, the positional displacement due to the thermal elongation difference further occurs between the stationary parts. Then, the sealing member 40 receives operation as described with reference to FIG. 4 in the first embodiment. Then, the sealing member 40 becomes vertical as illustrated in FIG. 10.

In this state, the sealing member 40 is in plane-to-plane contact with the projection surface 26b of the projection 26 and the projection surface 36b of the projection 36 which are vertical flat surfaces. Thus, leakage of steam from the high pressure side to the low pressure side can be suppressed securely. Here, the state illustrated in FIG. 4 is realized during, for example, the rated operation of the steam turbine 100.

As described above, in the stationary part sealing structure 11 of the second embodiment, even when the positional displacement due to the thermal elongation difference has occurred between stationary parts, an amount of steam leakage from the high pressure side to the low pressure side via the stationary part sealing structure 11 can be reduced further by disposing the sealing fin 70 together.

In the embodiments as described above, spaces under different pressures can be partitioned, and leakage of steam with respect to the positional displacement can be suppressed in the turbine rotor axial direction and in the radial direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stationary part sealing structure provided between a first stationary part and a second stationary part, the first stationary part being provided outside the second stationary part, and partitioning spaces under different pressures, the stationary part sealing structure comprising:
    a first insertion groove formed annularly across a circumferential direction in a wall surface, which opposes the second stationary part, of the first stationary part, the first insertion groove having a first groove part and a pair of first projections projecting respectively from two side faces of the first groove part so as to narrow an opening of the first groove part;
    a second insertion groove formed annularly across a circumferential direction in a wall surface, which opposes the first insertion groove, of the second stationary part, the second insertion groove having a second groove part and a pair of second projections projecting respectively from two side faces of the second groove part so as to narrow an opening of the second groove part; and
    a platy annular sealing member having an outer diameter side end inserted in the first insertion groove and an inner diameter side end inserted in the second insertion groove,
    wherein the sealing member is in contact with one of the projections in each of the first and second insertion grooves and not in contact with the other projections in each of the first and second insertion grooves due to a pressure difference between the partitioned spaces, and
    wherein one of an opening distance between the first projections and an opening distance a between the second projections is longer than the other opening distance.

2. The stationary part sealing structure according to claim 1,
    wherein, when a positional displacement due to a thermal elongation difference occurs between the first stationary part and the second stationary part, the sealing member becomes vertical and is in plane-to-plane contact with one of the first projections and one of the second projections.

3. The stationary part sealing structure according to claim 1,
    wherein corner portions of the first projection and the second projection are round chamfered.

4. The stationary part sealing structure according to claim 1,
    wherein corner portions of the first projection and the second projection are flat chamfered.

5. The stationary part sealing structure according to claim 1, further comprising, in the first stationary part, a sealing fin which extends toward the second stationary part side and abuts on the second stationary part,
    wherein the sealing fin does not abut on the second stationary part when a positional displacement due to a thermal elongation difference occurs between the first stationary part and the second stationary part.

* * * * *